United States Patent [19]
LeComte et al.

[11] Patent Number: 6,009,757
[45] Date of Patent: Jan. 4, 2000

[54] VOLTAGE REGULATED PRESSURE TRANSDUCER APPARATUS

[75] Inventors: Norman E. LeComte, West Greenwich, R.I.; Dale R. Sogge, Wrentham; Neal Pugh, Taunton, both of Mass.; Edward F. Racca, Warwick, R.I.

[73] Assignee: Texas Instruments Incorporated, Dallas, Tex.

[21] Appl. No.: 09/079,625

[22] Filed: May 15, 1998

Related U.S. Application Data

[60] Provisional application No. 60/053,987, Jul. 28, 1997.

[51] Int. Cl.[7] ........................................................ G01L 9/12
[52] U.S. Cl. .......................................... 73/724; 361/283.4
[58] Field of Search ................... 73/724, 718; 361/283.4

[56] References Cited

U.S. PATENT DOCUMENTS

| | | |
|---|---|---|
| 4,875,135 | 10/1989 | Bishop et al. . |
| 4,982,351 | 1/1991 | Kawate et al. . |
| 5,051,937 | 9/1991 | Kawate et al. ......................... 73/724 X |
| 5,770,802 | 6/1998 | Berthold et al. ........................... 73/765 |

*Primary Examiner*—Joseph L. Felber
*Attorney, Agent, or Firm*—Russell E. Baumann; Richard L. Donaldson

[57] ABSTRACT

A capacitive transducer (10) has a housing (12) which receives a variable capacitor (14) in a fluid pressure receiving chamber (12e). A support (20) is received on an annular shoulder (12j) formed in the sidewall (12h) of the housing. The support has inner and outer concentric ring shaped lands (20k, 20l) with the inner ring shaped land engaging the variable capacitor (14) inboard of the outer peripheral edge of the capacitor. A shelf (20d) is formed on the sidewall of the support which receives a first relatively rigid substrate (26a) of a circuit board which has a second relatively rigid substrate (26b) bent through a connecting flexible strip so that the second substrate overlies the first substrate within a circuit receiving chamber (20c). A ratiometric signal conditioning circuit portion 28a and voltage regulating circuit portion 28b are mounted on the circuit board. The voltage regulating circuit is used to convert the transducer into a variable supply/fixed output device and includes a precision voltage regulator (U2) having an input capability of a portion of the range of the variable supply voltage, an NPN transistor (Q1) to provide a variable resistance in the primary current path, a zener diode D3, a current regulating diode (D2) to bias the transistor and the zener diode, a blocking diode (D1) and associated capacitors (C13, C14, C15).

14 Claims, 8 Drawing Sheets

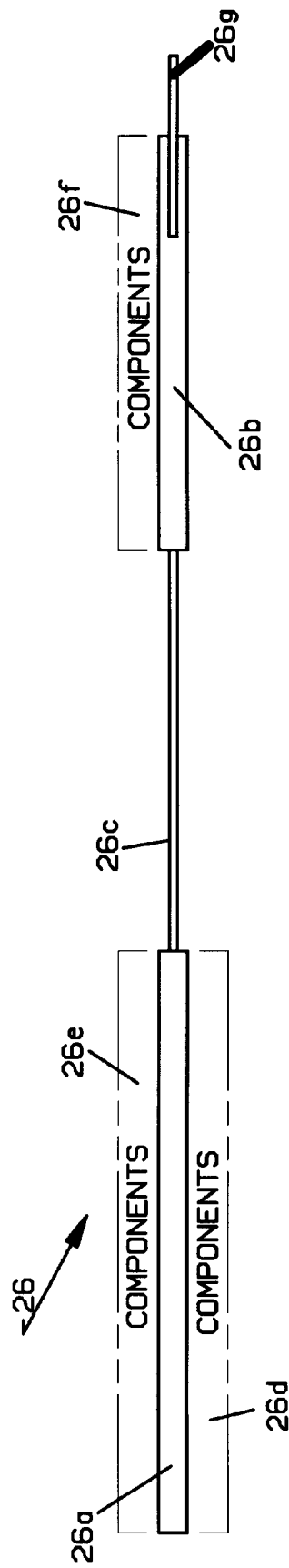

VOLTAGE REGULATED PRESSURE TRANSDUCER APPARATUS

This application claims priority under 35 USC § 119(e)(1) of provisional application Ser. No. 60/053,987 filed Jul. 28, 1997.

FIELD OF THE INVENTION

This invention relates generally to capacitive transducers and to power supplies for such transducers and more particularly to a sensor having a pressure responsive transducer mounted in a housing along with a voltage regulated electrical circuit for use with such sensors.

BACKGROUND OF THE INVENTION

A known pressure sensor, as shown in U.S. Pat. No. 4,875,135, comprises a capacitive pressure transducer having a thin ceramic diaphragm mounted in closely spaced, sealed, overlying relation to a ceramic base, and having metal coatings deposited on respective opposing surfaces of the diaphragm and the base to serve as capacitor plates arranged in predetermined closely spaced relation to each other to form a capacitor. The diaphragm, at a first face surface of the transducer, is arranged to be exposed to an applied fluid pressure to provide a capacitance which varies in response to changes in the applied pressure. Transducer terminals are disposed on the opposite, second, face surface of the transducer. A connector body formed of electrical insulating material has connector terminals mounted on the body and a metal housing secures the connector body in overlying relation to the second face surface of the transducer to form a chamber therebetween. An electrical circuit is disposed in the chamber electrically connected to the transducer and connector terminals for providing an electrical signal corresponding to the applied pressure.

The electrical circuit includes a flexible substrate which has one end portion disposed in overlying relation to the second face surface of the transducer and which mounts electrical circuit components in electrically connected relation to the transducer terminals and an opposite end portion folded over and in alignment with said one end portion. The opposite end portion mounts circuit paths thereon which are electrically connected to the connector terminals.

Signal conditioning circuits used with capacitive pressure transducers, as described, couple the transducer to a reference capacitor in a charge-lock loop relation having a common node for forming a capacitance-to-voltage converter circuit which is ratiometric with respect to supply voltage to vary output voltage within a selected range in response to variations in transducer capacitance in a corresponding range as set forth in commonly assigned U.S. Pat. No. 4,982,351. An array of switches cycles the voltage across the transducer and reference capacitors with opposite transitions with a predetermined frequency so that change in transducer capacitance results in a differential voltage at the common node. That voltage is then amplified or otherwise conditioned to drive a current-source sink network to adjust the sensor output voltage and, by a feedback path, to restore a balance condition at the node, thereby to maintain the sensor output voltage at a level related to the transducer capacitance.

Capacitive pressure transducers having ratiometric signal conditioning circuits as described above are in wide use in equipment incorporating A/D converters and sensors in networks having a reference that defines a given range. For example, the same 5 volt supply used to power the sensor is used for setting the range on the A/D converter so that changes in supply will affect both the converter and the sensors thereby desensitizing the network to such changes.

However, in an industrial environment, typically separate power supplies are employed for transducers which may be mounted at various different locations of a site. Such power supplies can vary widely, for example, between 8 and 36 volts. Although pressure responsive capacitive transducers having voltage regulators are known in the prior art, they are of relatively high cost and exhibit poor accuracy relative to their cost.

SUMMARY OF THE INVENTION

It is an object of the invention to provide a low cost capacitive transducer having an output which is insensitive to variations in supply voltage. Another object is the provision of apparatus for converting a low cost ratiometric capacitive pressure transducer to one which is insensitive to variations in supply voltages ranging from 8 VDC to 36 VDC, having a voltage regulation circuit for use in industrial environments having varying voltage supplies. Another object is the provision of a signal conditioning electric circuit which can operate over a wide range of supply voltage without any sensitivity to the output, that is, a circuit which will provide a predetermined voltage regardless of supply voltage, within a selected range of voltage. Another object is the provision of a voltage regulated capacitor transducer package which can be manufactured and assembled using existing ratiometric capacitive transducer manufacturing processes and lines.

Briefly described, a ratiometric, variable capacitive transducer having a voltage regulation circuit made in accordance with the invention comprises a housing having a fluid pressure receiving port at a first end leading into a fluid pressure chamber with a generally cylindrical variable capacitor having a fluid pressure responsive diaphragm mounted on a substrate disposed in the housing with the diaphragm exposed to the fluid pressure chamber. A support member is received on an annular shoulder formed in the sidewall of the housing and has a ring shaped land surface on the bottom thereof adapted to engage the substrate surface of the variable capacitor at a location inboard of the outer perimeter of the variable capacitor. The support member has a sidewall forming an electric circuit chamber with an annular shelf formed in the sidewall. A signal conditioning and voltage regulating electrical circuit comprising first and second relatively inflexible substrate portions connected by a flexible strip is disposed in the electric circuit chamber with the first substrate portion received on the shelf and the flexible strip bent so that the second substrate portion overlies the first substrate portion. Circuit components are mounted on both face surfaces of the first substrate portion and on the face surface of the second substrate portion facing the first substrate portion. Closely spaced radially extending ribs are formed in the shelf along the entire periphery of the shelf. Terminal pins extending from the variable capacitor extend through apertures in the bottom wall of the support member and are attached to the electric circuit as are connector terminal pins extending through a connector body received in the opening of the housing at the second end thereof. The distal free end of the housing sidewall is bent inwardly over a flange of the connector body to clampingly attach the connector body to the housing.

The electrical circuit received in the electrical circuit chamber comprises a first signal conditioning circuit portion which includes a reference capacitor connected to the variable capacitor to form a common node in a charge lock loop relation for forming a capacitance to voltage converter circuit which is ratiometric with respect to supply voltage. A second voltage regulating circuit portion provides a constant 5 volt output voltage over a range of input voltages ranging from 8 to 36 VDC and comprises a precision voltage regulator having a 5 volt output from an input range of approximately 5.5 to 15 volts, an NPN pass transistor to provide a variable resistance in the primary circuit supply path, a zener diode connected to the base of the transistor to establish a pre-regulated maximum voltage of 15 volts at the input of the precision regulator, and a current regulating diode to bias both the transistor and the zener diode while drawing a relatively constant, minimal supply current. A blocking diode is also provided to guard against reverse polarity connection. The second circuit portion provides an accurate and stable output which is used as the supply voltage for the first circuit portion.

BRIEF DESCRIPTION OF THE DRAWINGS

Other objects, advantages and details of the novel and improved transducer and voltage regulated circuit of the invention appear in the following detailed description of preferred embodiments of the invention, the detailed description referring to the drawings in which:

FIG. 5 is a front elevational view of an electric circuit substrate shown in a flat condition prior to installation in the FIG. 1 transducer and showing a schematic representation of electronic components mounted thereon;

DESCRIPTION OF PREFERRED EMBODIMENTS

Figure 1:
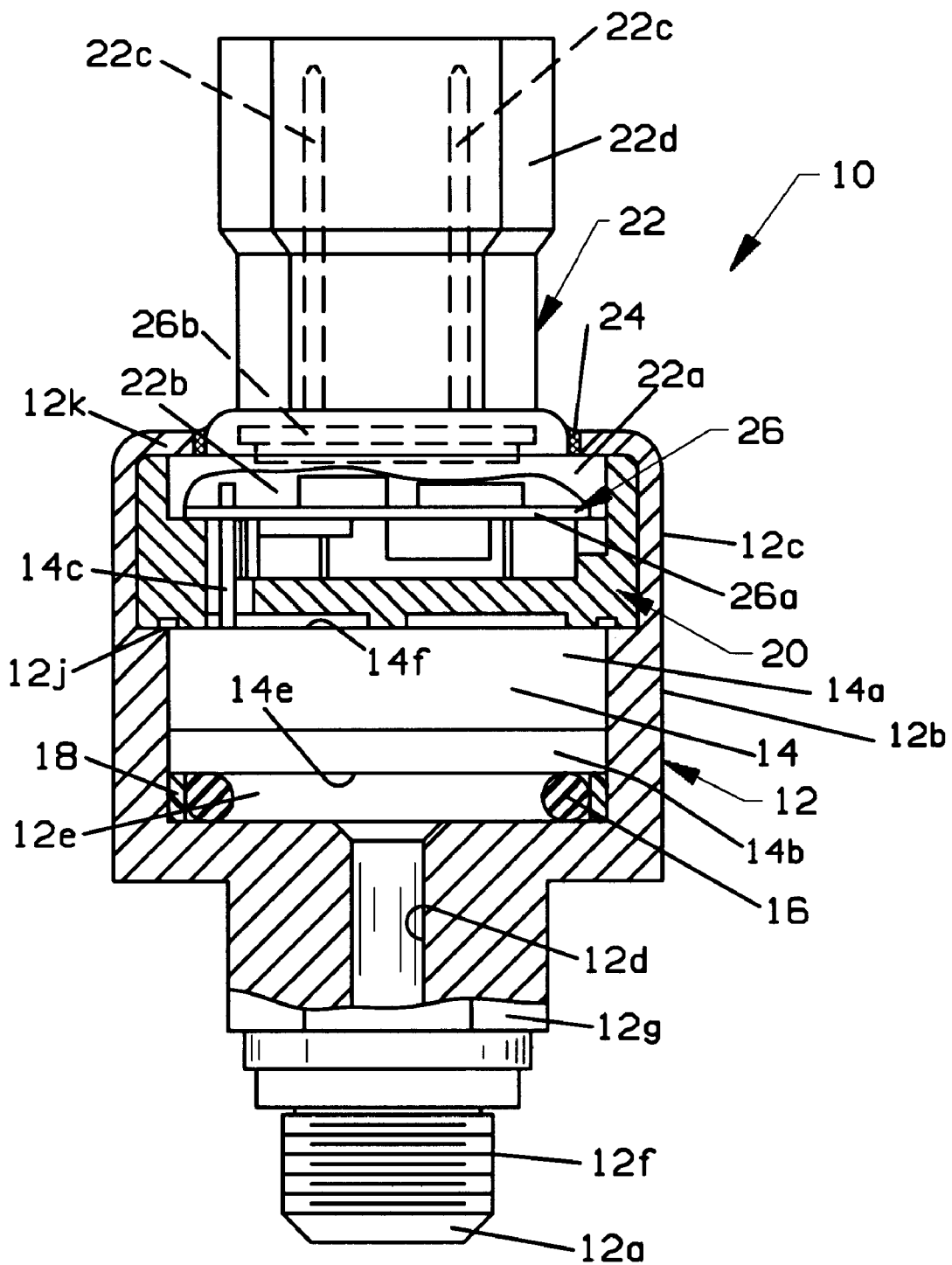
FIG. 1 is a partial cross sectional view taken along the longitudinal axis of a variable capacitive transducer made in accordance with the invention.

With reference to FIG. 1, numeral 10 designates a voltage regulated variable capacitive transducer made in accordance with the invention which comprises a metallic housing 12 having a first end 12a, an intermediate portion 12b and a second end 12c. A fluid pressure port 12d extends from the first end into a fluid pressure chamber 12e. A threaded portion 12f and hexagonal feature 12g facilitate connection of the transducer to a fluid pressure source. Intermediate portion 12b is formed by a generally cylindrical sidewall 12h with an annular shoulder 12j formed in the wall for reception of a support member 20 to be discussed below. A variable capacitor 14 is disposed in fluid pressure chamber 12e along with a sealing gasket 16 of suitable elastomeric material and a ring 18 of polytetrafluorethylene or the like to prevent high pressure extrusion of the gasket between capacitor 14 and sidewall 12h. Variable capacitor 14 has a fluid pressure responsive flexible diaphragm on a first face surface thereof exposed to pressurized fluid in fluid pressure chamber 12e and a second, opposed, rigid substrate face surface 14e. Electrically conductive capacitor plates (not shown) are disposed in sealed, spaced overlying relation on the diaphragm and substrate with the spacing therebetween varying in response to the pressure of the fluid received in chamber 12e in a known manner and as shown, for example, in U.S. Pat. No. 4,875,135 assigned to the assignee of the present invention, the subject matter of which is incorporated herein by this reference. Capacitor terminals 14c (one of which is shown in FIGS. 1, 2) extend upwardly, as shown in the drawings, for connection to an electric circuit to be discussed below.

Figure 2:
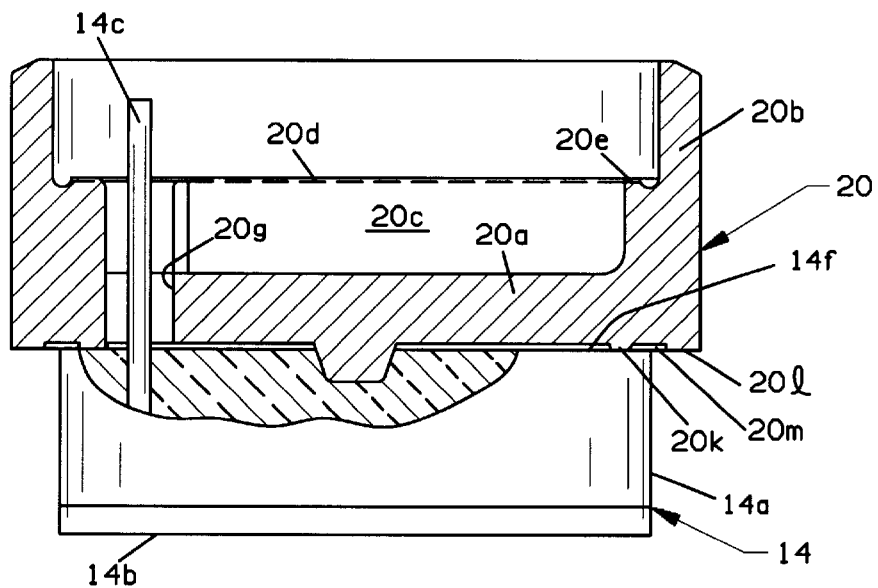
FIG. 2 is an enlarged cross sectional view of a support member of the FIG. 1 transducer taken on line 2—2 of FIG. 4 also shown with a variable capacitor, partially in cross section.
Figure 4:
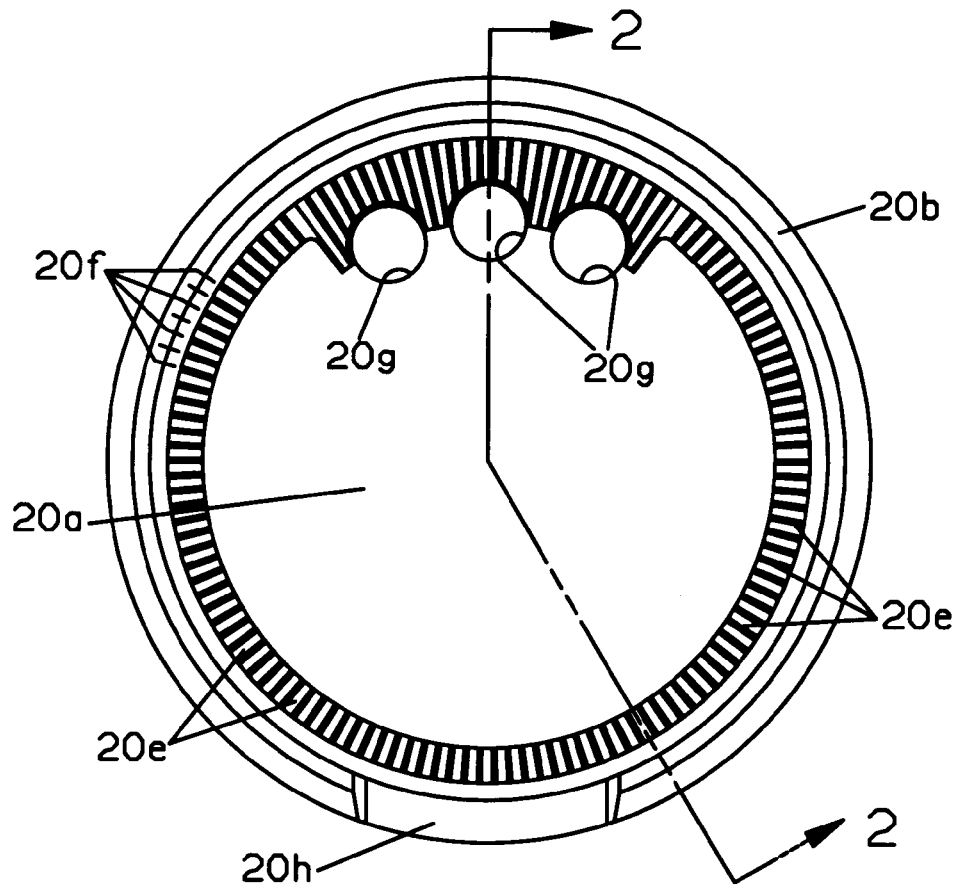
FIG. 4 is a top plan view of the FIG. 2 support member.
Figure 4A:
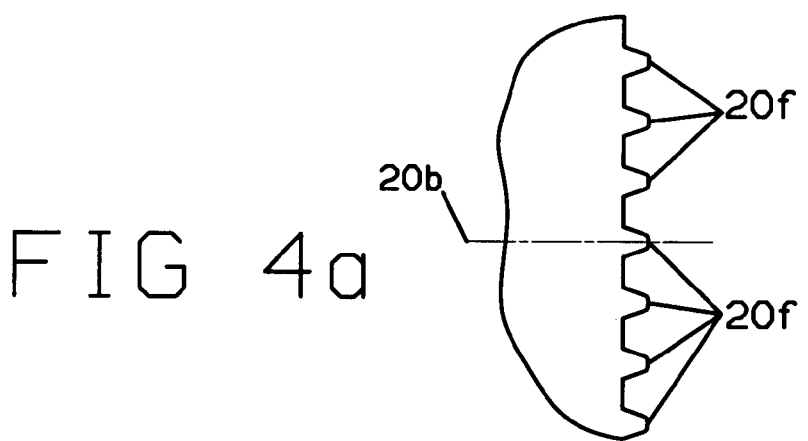
FIG. 4a is an enlarged, broken away portion of FIG. 4.

Support member 20, as best seen in FIGS. 2 and 4, is generally cup shaped and is comprised of a suitable electrically conductive material such as a nickel iron alloy. Support member 20 may be molded or cast having a bottom wall 20a and an upstanding sidewall 20b defining an electric circuit chamber 20c. An annular shelf 20d is formed in the sidewall 20b with a plurality of spaced, radially extending ribs 20e projecting upwardly approximately 0.005 inch from the shelf. A plurality of similar 0.005 inch high ribs 20f extend in an axial direction in a portion of the sidewall 20b above shelf 20d to the distal free end of the sidewall (see FIGS. 4, 4a). Spaced apart bores 20g are formed through bottom wall 20a for reception of capacitor terminals referenced above. A cut-out 20h is formed in a portion of sidewall 20b extending downwardly from the distal free end to a location adjacent shelf 20d to provide space for a flexible strip of the electric circuit substrate, to be discussed infra.

Figure 3:
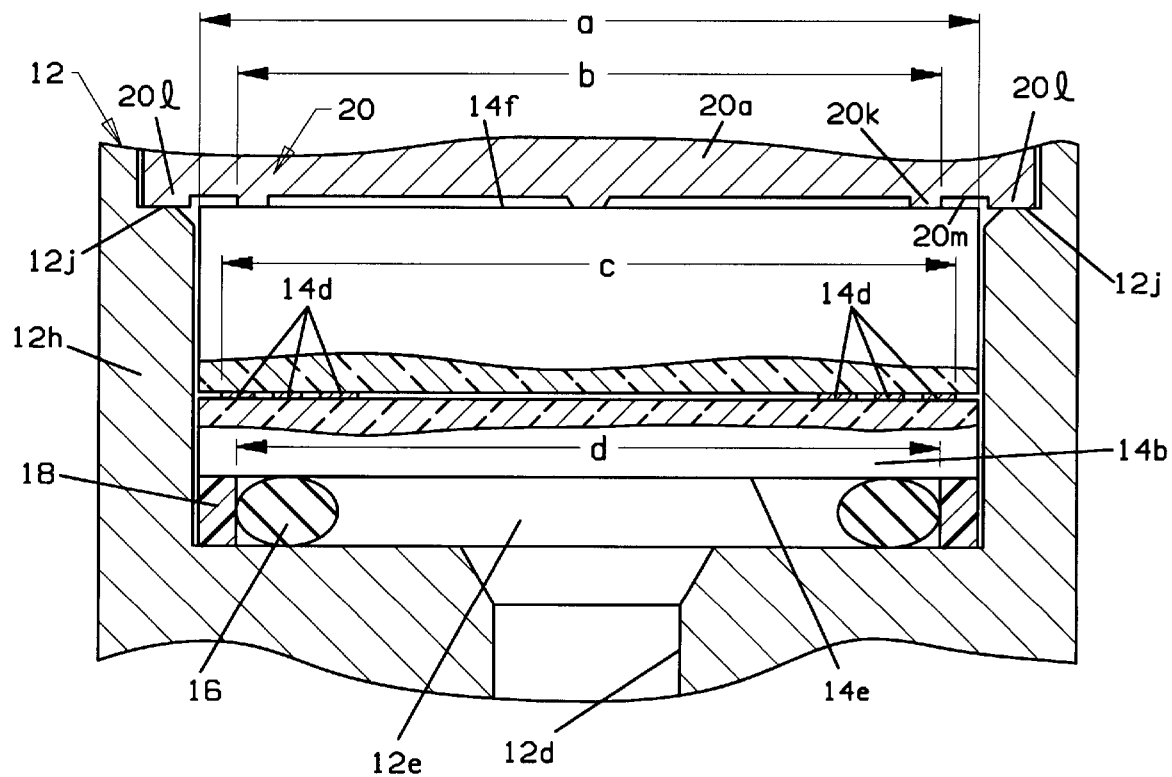
FIG. 3 is an enlarged portion of FIG. 1, modified slightly for purposes of illustration.

With reference to FIGS. 1 and 3 capacitor 14 comprises a substrate 14a and diaphragm 14b of suitable material such as ceramic attached thereto in spaced apart, sealed relation by an annular seal 14d of suitable material such as glass. Capacitor 14 is generally cylindrical having a diameter a and annular glass seal 14e has an outer diameter of c. Diaphragm 14b is a flexible member having an outer face surface 14d exposed to pressurized fluid being monitored with the pressurized area portion of the diaphragm having a diameter d, i.e., the inside diameter of ring 18.

Inner and outer circular, concentric ring shaped lands, 20k, 20l respectively, project downwardly, as best seen in FIGS. 2, 3, from bottom wall 20a with a recess or groove 20m therebetween. Ring shaped land 20l is received on shoulder 12j of sidewall 12h and ring shaped land 20k engages the substrate surface 14f of variable capacitor 14 at a location spaced no more than, and preferably slightly inboard, of the outer diameter of glass seal 14d, which, as shown in FIG. 3, is itself inboard of the outer perimeter of capacitor 14. This arrangement ensures in-line support of the ceramic substrate and the diaphragm and is aligned with the pressurized area of diaphragm 14b defined by diameter d. As a result, torque is essentially eliminated. The use of a relatively narrow support surface defined by land 20k also reduces variability by limiting the support surface to a relatively narrow support location. By way of example, devices made in accordance with the invention may have the following values. Diameter a of capacitor 14 of 0.830 inch; diameter b, the outer diameter of land 20k, of 0.758 inch; diameter c, the outer diameter of glass seal 14d, of 0.780 inch and diameter d, the diameter of the pressurized area of diaphragm 14b, of 0.750 inch. In this illustration, the inside diameter of land 20k may be 0.691 inch. Thus, the provision of land 20k avoids placing undesirable torque forces on the outer peripheral edge portion of the diaphragm surface thereby increasing the level of pressure which could cause damage to the material of capacitor 14, typically composed of ceramic.

A connector body 22, FIG. 1, formed of electrically insulative material, has a first end formed with a radially, outwardly extending flange 22a and a recess 22b. The first end of the connector body is received within the opening formed by the distal free end of sidewall 20b of the cup shaped support member with recess 22b forming a continuation of the electric circuit chamber 20c. Connector terminals 22c, two of which are shown in phantom lines in FIG. 1, extend from a location within shroud forming sidewall 22d, through the connector body into recess 22b for connection to the voltage regulating and signal conditioning circuitry to be discussed below. The distal free end 12k of the sleeve forming sidewall 12h of housing 12 is deformed inwardly to clampingly engage support member 20 and flange 22a of connector body 22. An environmental seal is typically provided between electric circuit chamber 20c and the outer environment by a suitable gasket or the like, or as shown, by suitable epoxy 24 injected into the space between the distal free end of wall 12k and the connector body.

Figure 6:
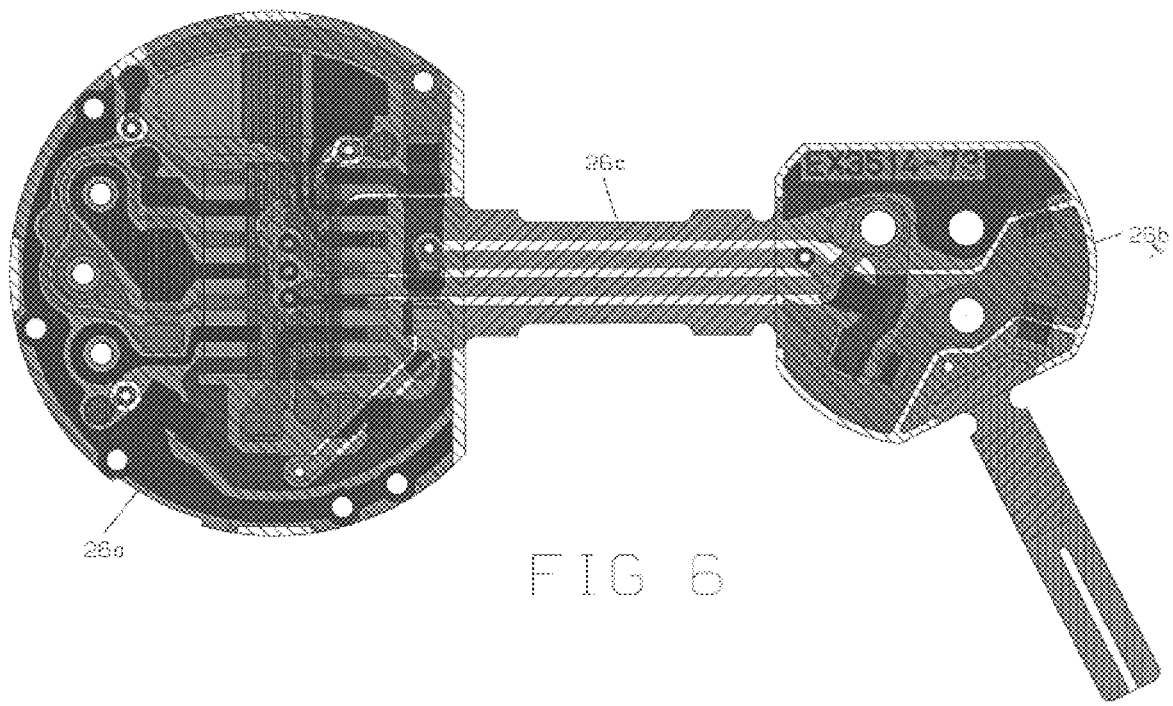
FIGS. 6 and 7 are top and bottom plan views, respectively, of the FIG. 5 electric circuit substrate shown with exemplary electronic components mounted thereon.
Figure 7:
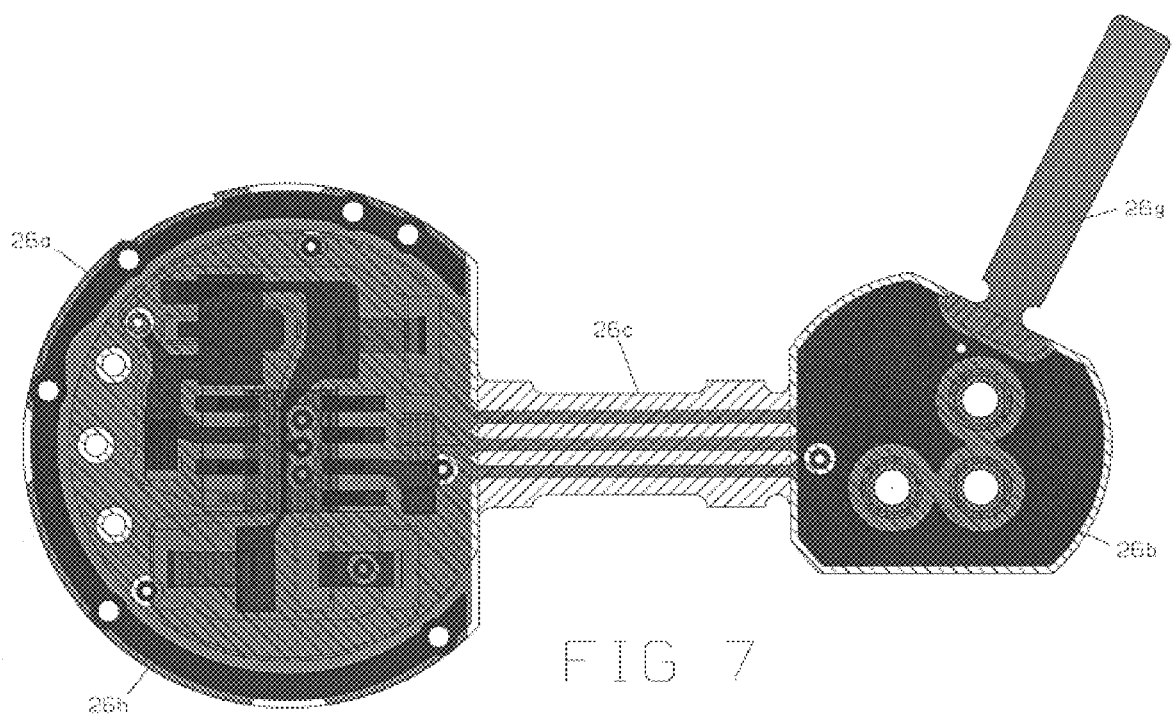

Signal conditioning and voltage regulating circuitry 26 (FIGS. 5–7), disposed in electric circuit chamber 20c, comprises first and second relatively inflexible substrate portions 26a, 26b connected by a relatively flexible strip 26c. As seen in FIG. 5, electronic components 26d, 26e, shown in dashed lines, are mounted respectively on opposed faced surfaces of first substrate portion 26a and electronic components 26f are mounted on one face surface of second substrate portion 26b. A flexible strip 26g extends outwardly from second substrate portion 26b.

First substrate portion 26a is received on annular shelf 20d of support member 20 with conductive annular trace 26h engaging ribs 20e and with electronic components 26d projecting downwardly into circuit chamber 20c toward bottom wall 20a and electronic components 26e projecting upwardly into the chamber. Cut-out or slot 20h provides room for flexible strip 26c which is bent into a generally U-shaped configuration with electronic components 26f projecting downwardly toward but spaced from components 26e. Strip 26g, having an electrically conductive ground strip, is trained between wall 20b and flange 22a of connector body 22 at a location aligned with axially extending ribs 20f.

Figure 8:
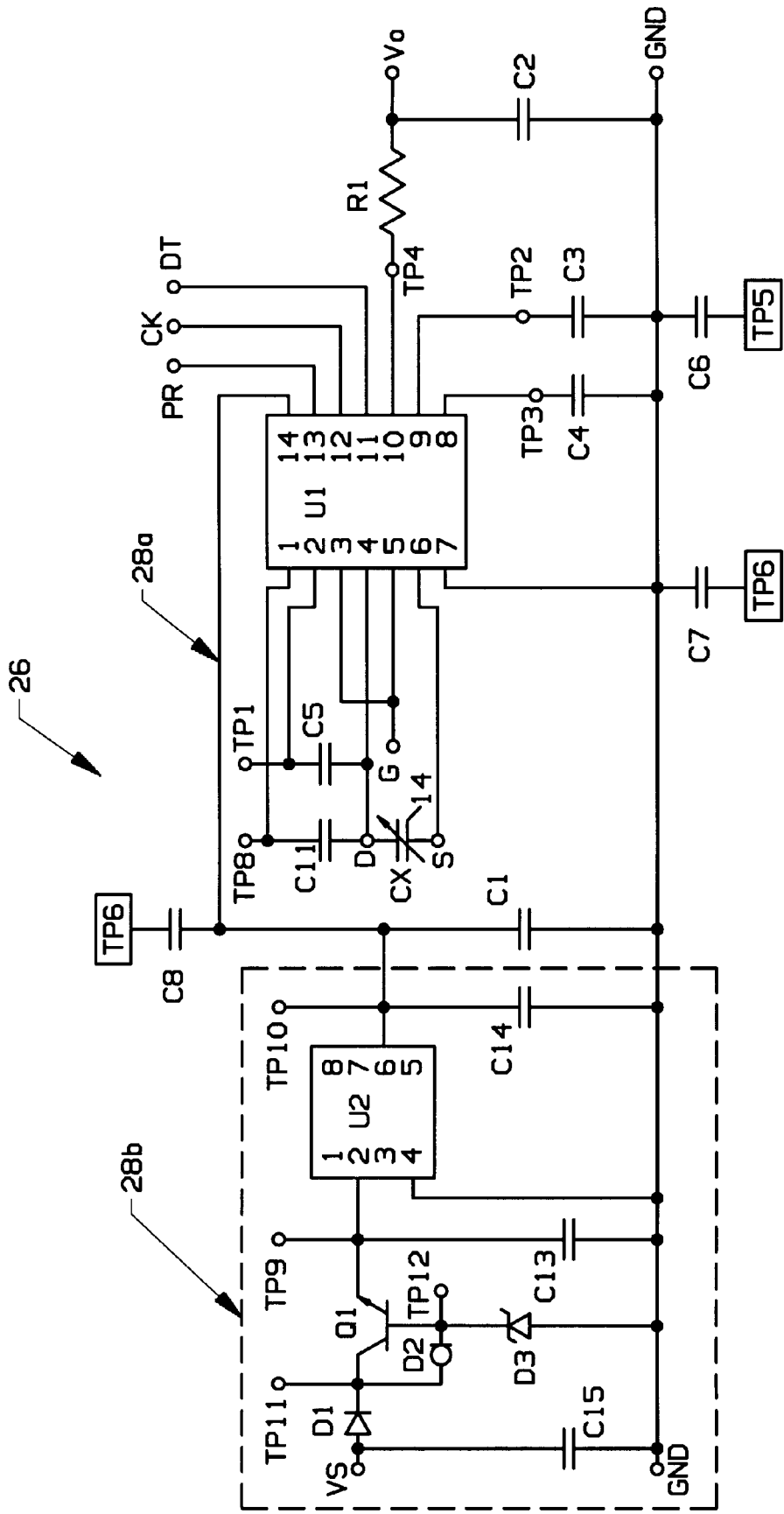
FIG. 8 is a circuit diagram of the signal conditioning and voltage regulating circuitry mounted on the FIGS. 5–7 electric circuit substrate.

With reference to FIG. 8, circuitry 26 includes a signal conditioning portion 28a and a voltage regulating portion 28b. Portion 28a comprises a capacitive signal conditioning ASIC U1, of the type described in greater detail in co-assigned U.S. Pat. Nos. 4,982,351 and 5,770,802 the subject matter of which is incorporated herein by this reference. Variable capacitor 14 is connected between pins 6(S) and 4(D) of integrated circuit U1. Pin 4 forms a common node with a reference capacitor C5 connected between pins 2 and 4 of integrated circuit U1. A linearization capacitor C11 is connected between pins 1 and 4. A shield generator is connected to shield pins 3 and 5 (G) to guard the conductor runs connected to pin 4 in a known manner. Pin 7 (VSS) is connected to ground while pin 14 is the voltage source pin (VDD). Filter capacitor C1 is connected across VDD, VSS pins 14, 7. Pin 10 is connected through resistor R1 to $V_O$ the output of circuitry 26, with capacitor C2 connected between $V_O$ and ground pin 7. Program, clock and data pins PR, CK and DT (13, 12, 11) are used for programming ASIC U1 and TP locations relate to various test points of the circuitry.

ASIC U1 converts small capacitive changes in capacitor C14 to relatively large changes in output voltage. The input capacitance varies in response to the application of fluid pressure received on diaphragm surface 14a.

As noted supra, ASIC U1 is a capacitance to voltage converter circuit which is ratiometric with respect to supply voltage to vary output voltage within a respective range in response to variations in transducer capacitance in a corresponding range. In order to use ASIC U1 in applications which require an output which is independent of supply voltage over a selected range typically provided in industrial environments, for example, between approximately 8 VDC and 36 VDC, additional circuitry must be provided to convert the supply voltage to a constant, selected voltage for powering the ratiometric circuitry. According to the invention, a low cost, regulated voltage supply network, electric circuit portion 28b, is included in circuitry 26 and comprises a precision voltage reference U2, a zener diode D3, a current regulating D2, an NPN pass transistor Q1, a blocking diode D1 and associated filter capacitors C13, C14 and C15.

Available precision voltage references are limited to a maximum input voltage lower than that required for the intended application. For example, Analog Devices REF-195G, a voltage reference designated as U2 in FIG. 8, is one such device which can be used which provides an accurate 5 volt DC output voltage; however, it is limited to an approximately 15 VDC input. The main electrodes of an NPN transistor Q1 are connected between voltage reference U2 and supply voltage $V_S$ with a 15 volt zener diode D3 connected between the base of transistor Q1 and ground to establish a pre-regulated maximum voltage of 15 volts at the input of voltage reference U2. Pass transistor Q1 provides a variable resistance in the primary current supply path to drop the greater part of the voltage differential between the supply voltage, up to 36 VDC, and the 15 VDC capability of voltage reference U2. However, it should be noted that even if a higher input capability voltage reference were to be used, diode D3 would still be useful in that it serves to limit the input voltage swing to reference U2 over a broad supply voltage range, thereby minimizing drift associated with line regulation. Transistor Q1 drops the line voltage between voltage supply $V_S$ and the input pin 2 of voltage reference U2 while requiring only a minimal necessary bias and load current to be drawn from the power supply. This current is thus essentially independent of supply voltage and drop across transistor Q1.

Current regulating diode D2 connected between the collector and base of transistor Q1 provides biasing for both diode D3 and transistor Q1. One such current regulating diode, CRDF-152 of Semitec, passes between 1.23 MA and 1.78 mA over a voltage drop range of 2V to 100V. Below 2V it can be modeled as a 4K ohm resistor. Diode D2 is used to balance the requirements to provide adequate base drive current for transistor Q1 at a low supply voltage, e.g., 8 VDC, while drawing minimal supply current, e.g., less than 2 mA, at a high supply voltage, e.g., 36V.

The anode of diode D1 is connected to supply voltage $V_S$ and the cathode is connected to the collector of transistor Q1, with diode D1 serving to stand off voltage and block current flow should supply voltage be connected in the reverse polarity. If such connection occurs, diode D2, Diode D3 and the collector of transistor Q1 will be forward biased and diode D1 will stand off the entire reverse supply voltage. Capacitor C15, connected between supply voltage $V_S$ and ground which provides noise filtering on the supply line, has a working voltage of 50 volts and is the limiting element in a reverse voltage protection condition. In an over voltage condition, diode D1 will be forward biased (approximately 0.7V) with zener diode D3 breaking down and regulating at 15V. The maximum collector to base voltage of Q1 is added to the zener regulation voltage and the forward bias voltage of D1 to define the maximum over voltage capability of the circuit, i.e., 50 volts.

Capacitors C13, C14, connected between input pin 2 and ground and output pin 6 and ground, respectively, are used to meet noise specifications of voltage reference U2.

By using current regulating diode D2 instead of a conventional resistor to bias the collector-base junction of transistor Q1, a broader range of voltages can be covered without having a significant change in device supply current. Use of a conventional resistor, on the other hand, would result, for example, in a device supply current range between 6 mA at the low end of the supply voltage range (8 volt) and approximately 20 mA at the high end of the supply voltage range (36 volts). In view of the fact that there may be many other sensors and other devices on the same line, use of a resistor would result in an undesirable, excessive current drain. However, use of current regulating diode D2 in accordance with the invention results in essentially a constant total supply current of approximately 6.5 to 7.5 mA over the 8–36 volt range.

At supply voltages $V_S$ below 15 volts the voltage applied to input pin 2 of voltage reference U2 is essentially supply voltage $V_S$ minus 0.7V, the diode drop of diode D1, and the voltage saturation drop of transistor Q1 of a couple of hundred mV so that the voltage applied at pin 2 is maximized with respect to low supply voltage. Once the supply voltage increases above 15 volts diode D3 starts to clamp. Transistor Q1 will come out of saturation and a voltage will start to develop across the collector-emitter electrodes. Because the base is clamped, voltage across the collector-base and across diode D2 will start to rise. Thus, with respect to high supply voltage, for example, in the case when there is a 36 VDC supply there will be approximately a 14.3 VDC at input pin 2 with 0.7 VDC across diode D1 and the remainder of approximately 21 VDC will be dropped across the collector-emitter electrodes of transistor Q1.

The transducer package shown in FIG. 1 comprises components used in making the ratiometric capacitive transducers referenced supra, with the sidewall 12h of the housing being elongated to receive support member 20 and transducer pins 14c being similarly elongated so that voltage regulated transducers can be made using existing manufacturing processes and lines.

Figure 9:
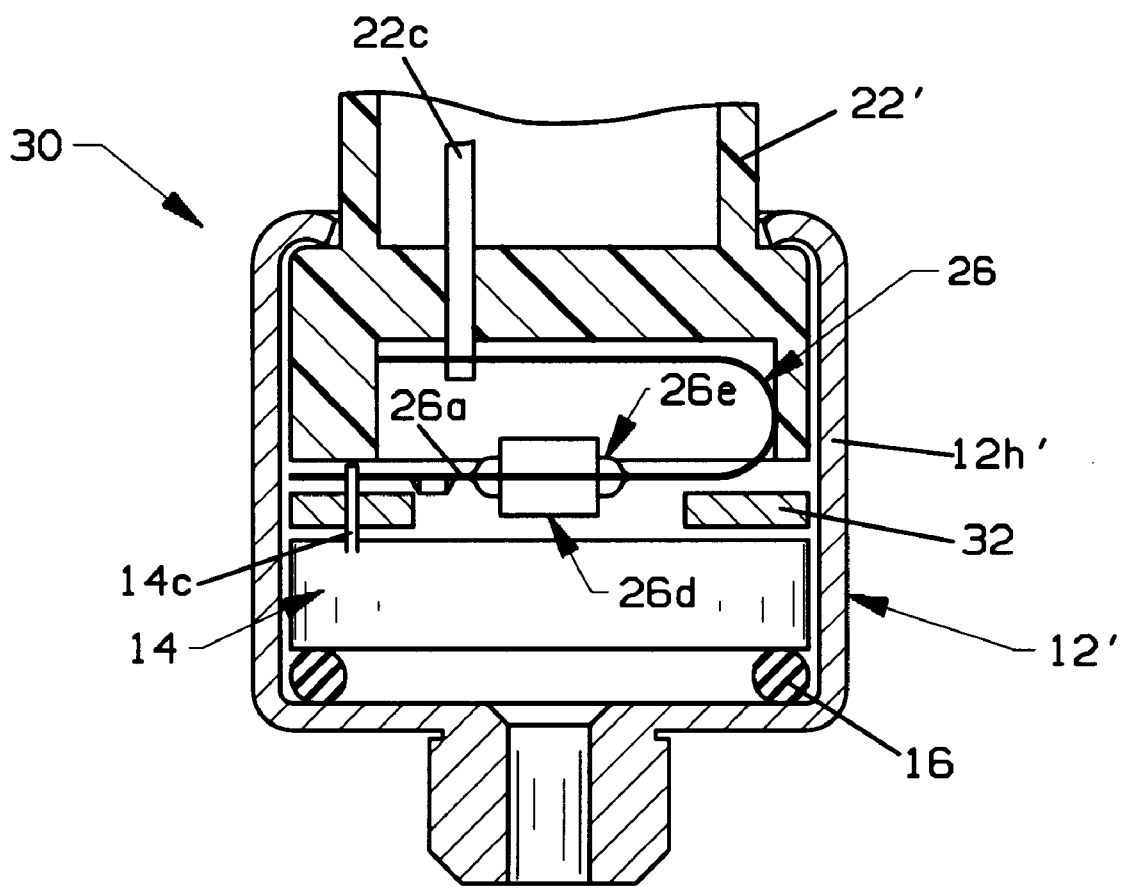
FIG. 9 is a broken away cross sectional view of an alternate embodiment of the invention.

The transducer package shown in FIG. 1 which receives circuitry 26 can be used for fluid pressures ranging from several psi up to approximately 7000 psi. FIG. 9 shows an even lower cost, modified transducer package 30 which can be used for fluid pressures ranging from several psi up to approximately 600–1000 psi. In transducer 30, signal conditioning and voltage regulating circuitry 26 is mounted with space being provided for electronic components 26e, 26d extending from opposite sides of substrate 26a by means of annular member 32 formed of suitable plastic or metallic material. Connector body 22' is received within the open end of housing 12' formed by cylindrical wall portion 12h' and clamped therein in the same manner as described in the FIG. 1 embodiment.

Circuitry made in accordance with the invention provides an accurate and stable output which can be used to convert ratiometric sensors to a variable supply/fixed output type device as well as providing constant current draw over a wide range of supply voltages. The sensor package which receives the circuitry is an improved construction utilizing features for improving force transfer to the capacitor and optimizing ground connections between the package and the circuitry. The circuitry is disposed on a novel circuit board arrangement using the same and slightly modified component parts of an existing ratiometric capacitive transducer to take advantage of economies in an established manufacturing line.

It should be understood that although particular embodiments of the invention have been described by way of illustrating the invention, other embodiments of the invention are also possible. For example, the voltage regulating circuit portion of FIG. 8 can be used with signal conditioning electronics for various sensors other than fluid pressure sensing, as long as the design criteria calls for an extended supply voltage range, e.g., 8 VDC to 36 VDC, a load current of approximately 10 mA with an almost constant bias current draw independent of change in supply voltage, an over voltage and reverse voltage protection, an accurate initial output voltage (e.g., $V_{OUT}+/-0.2\%$) with low temperature drift (e.g., less than 20 ppm/° C.), good line and load regulation and high stability over life. The invention includes all modifications and equivalents of the disclosed embodiments falling within the scope of the allowed claims.

What is claimed:

1. A variable capacitive transducer comprising a housing having a first end with a fluid pressure receiving port extending into a fluid pressure chamber, a generally cylindrical sidewall extending to a distal free end at a second end, the distal free end forming an opening, an annular shoulder formed in the sidewall, a generally cylindrical variable capacitor having a pressure responsive flexible diaphragm and a substrate, the diaphragm attached to the substrate in spaced apart, sealed relation by an annular seal member, the variable capacitor disposed in the housing with the diaphragm exposed to the fluid pressure chamber, a generally cylindrical support member having a bottom surface formed with a first outer and a second inner concentric ring shaped land surface with a grove formed therebetween, the first outer ring surface received on the annular shoulder with the outer periphery of the variable capacitor aligned with the groove between the first and second ring surfaces whereby force is exerted on the substrate surface of the variable capacitor through the support member inboard of the outer periphery of the variable capacitor, the support member having a generally cylindrical sidewall enclosing an electric circuit chamber, an electric circuit disposed in the electric circuit chamber connected to the variable capacitor, a connector body formed of electrically insulative material having a recess and an annular flange at a first end and a second end formed with a terminal receiving shroud, a plurality of terminal pins extending from a location within the shroud through the connector body into the recess and connected to the electric circuit and the annular flange of the connector body received within the opening at the second end of the housing with the distal end of the sidewall of the housing bent inwardly to clampingly engage the annular flange of the connector body.

2. A variable capacitive transducer according to claim 1 in which the annular seal member is formed of glass having an outer diameter slightly less than the diameter of the capacitor and the outer diameter of the second ring shaped land surface is less than the outer diameter of the glass seal member.

3. A variable capacitive transducer according to claim 2 in which the diaphragm has a generally circular face surface exposed to fluid pressure and the outer diameter of the second ring land surface is greater than the diameter of the circular surface of the diaphragm exposed to fluid pressure.

4. A variable capacitive transducer according to claim 1 in which the sidewall of the support member is formed with an annular shelf and the electric circuit comprising first and second relatively inflexible substrate portions each having opposed face surfaces connected by a flexible strip, the flexible strip bent so that the second substrate portion overlies the first substrate portion, the first substrate portion received on the annular shelf and electrical components mounted on both face surfaces of the first substrate portion and on at least one face surface of the second face surface.

5. A variable capacitive transducer according to claim 4 in which closely spaced ribs are formed on the annular shelf.

6. A variable capacitive transducer according to claim 5 in which the closely spaced ribs extend in a radial direction.

7. A variable capacitive transducer according to claim 4 in which closely spaced ribs are formed in the sidewall of the support member extending in an axial direction between the shelf and the distal end of the sidewall.

8. A variable capacitor transducer according to claim 1 in which the electrical circuit comprises a reference capacitor having a substantially constant capacitance, the variable and reference capacitors connected to form a common node in a charge lock loop relation for forming a capacitance to voltage converter circuit which is ratiometric with respect to supply voltage, the electric circuit having a supply voltage input and an output, a voltage regulator circuit comprising a precision voltage regulator having an input and an output providing essentially a 5 volt output from an input range of approximately 5.5 volts to 18 volts, the output of the precision voltage regulator connected to the supply voltage input of the signal conditioning electric circuit, an NPN transistor having a collector and an emitter electrode and a base, the collector and emitter electrodes serially connected to the input of the precision voltage regulator, a 15 volt zener diode connected to the base of the transistor to establish a pre-regulated voltage of 15 volts at the input to the precision voltage regulator, and a current regulating diode connected between the collector and the base of the transistor to bias both the zener diode and the transistor.

9. A variable capacitor transistor according to claim 8 further comprising a blocking diode having a cathode connected to the collector of the transistor and an anode connected to the input of the voltage regulator circuit to provide reverse polarity protection.

10. A variable capacitive transducer comprising a housing having first and second ends, a fluid pressure receiving port at the first end, a fluid pressure chamber formed in the housing in fluid receiving communication with the port, a variable capacitor having a fluid receiving diaphragm disposed in the housing with the fluid receiving diaphragm exposed to the fluid pressure chamber, the housing having a sidewall extending to the second end, a circuit board having a first relatively inflexible portion having opposed face surfaces, electronic components mounted on both the opposed face surfaces of the first portion, a second relatively inflexible portion having opposed face surfaces and a relatively flexible strip interconnecting the first and second portions, the strip bent into a generally U-shaped configuration with the second portion overlying the first portion and electronic components mounted on the face surface of the second portion facing the first portion, and a connector body of electrically insulative material received at the second end of the housing with the circuit board disposed between the variable capacitor and the connector body, the sidewall of the housing having a distal end portion clamped onto the connector body, the variable capacitor having terminal pins extending therefrom connected to the first portion of the circuit board and the connector having spaced connector terminals connected to the second portion of the circuit board.

11. A variable capacitive transducer according to claim 10 in which a shoulder is formed in the sidewall of the housing and further comprising a support member received on the shoulder, the support member having a sidewall with a shelf formed in the sidewall of the support member, and the circuit board is received on the shelf of the support member.

12. A variable capacitive transducer according to claim 10 further comprising an annular member disposed between the variable capacitor and the connector body with electronic components of the circuit board received within a spaced defined by the annular member.

13. A variable capacitor transducer having an electrical output which varies in response to changes in a mechanical stimulus being monitored comprising a variable capacitor having a capacitance which varies with changes in the mechanical stimulus and a reference capacitor having a substantially constant capacitance, a signal conditioning electric circuit in which the variable and reference capacitors are connected to form a common node in a charge lock loop relation for forming a capacitance to voltage converter circuit which is ratiometric with respect to supply voltage, the signal conditioning electric circuit having a supply voltage input and an output, a voltage regulator circuit comprising a precision voltage regulator having an input and output providing essentially a 5 volt output from an input range of approximately 5.5 volts to 18 volts, the output of the precision voltage regulator connected to the supply voltage input of the signal conditioning electric circuit, an NPN transistor having a collector and an emitter electrode and a base, the collector and emitter electrodes serially connected to the input of the precision voltage regulator, a 15 volt zener diode connected to the base of the transistor to establish a pre-regulated voltage of 15 volts at the input to the precision voltage regulator, and a current regulating diode connected between the collector and the base of the transistor to bias both the zener diode and the transistor.

14. A variable capacitor transducer according to claim 13 further comprising a blocking diode having a cathode connected to the collector of the transistor and an anode connected to the input of the voltage regulator circuit to provide reverse polarity protection.

* * * * *